W. G. J. THOMPSON.
TOOL HOLDER.
APPLICATION FILED MAR. 14, 1918.
1,282,984.
Patented Oct. 29, 1918.
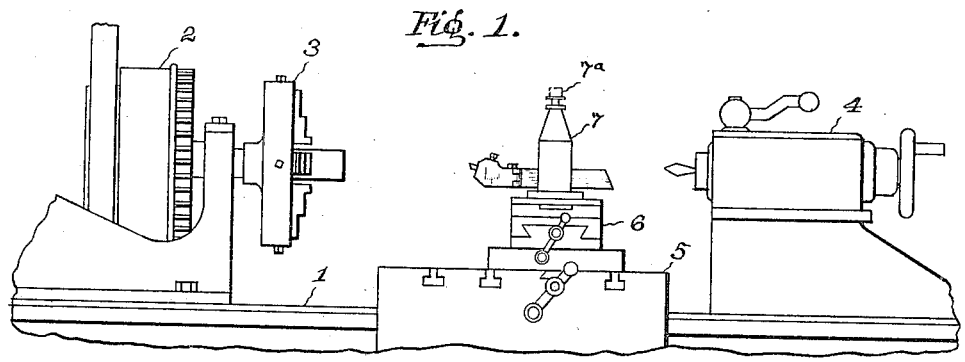
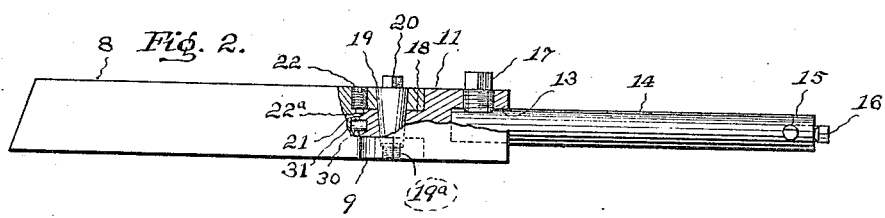
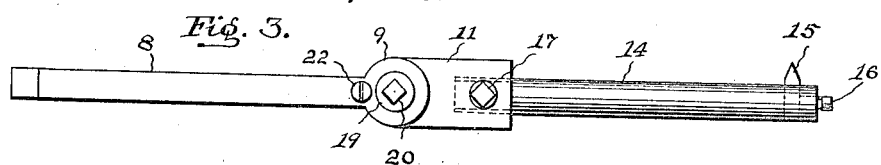
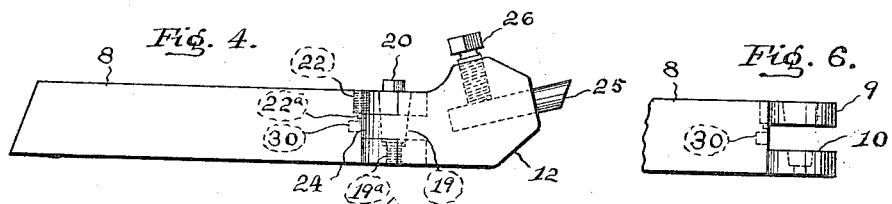
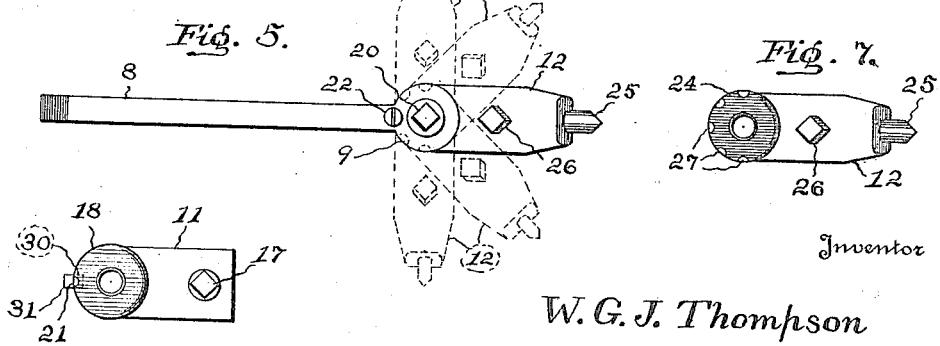
Inventor
W. G. J. Thompson
By H. S. Hill
Attorney

UNITED STATES PATENT OFFICE.

WILLIAM G. J. THOMPSON, OF CLINTON, MASSACHUSETTS.

TOOL-HOLDER.

1,282,984. Specification of Letters Patent. Patented Oct. 29, 1918.

Application filed March 14, 1918. Serial No. 222,269.

*To all whom it may concern:*

Be it known that I, WILLIAM G. J. THOMPSON, a citizen of the United States, residing at Clinton, in the county of Worcester, State of Massachusetts, have invented a new and useful Tool-Holder; and I do hereby declare the following to be a full, clear, and exact description of the invention, such as will enable others skilled in the art to which it appertains to make and use the same.

The present invention relates to a tool holder for lathes, and has for its object to provide a device of this character which embodies novel features of construction whereby the number of tools required by a machinist is greatly reduced, the single device being adjustable to do the work of a straight tool, left hand offset, right hand offset, and boring tool. The loss of time which is frequently occasioned by searching around the shop for some particular tool is thereby avoided.

Further objects of the invention are to provide a tool holder which can be readily applied to the tool post of a conventional lathe, which can be easily and quickly adjusted to perform the particular kind of work desired, and which will hold the working element rigidly in operative position.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawings, in which:—

Figure 1 is a side elevation of a conventional form of lathe having the tool holder applied thereto, portions being broken away.

Fig. 2 is an enlarged side elevation of the tool holder with a boring bar applied thereto, portions being broken away and shown in section.

Fig. 3 is a top plan view thereof.

Fig. 4 is a side elevation of the tool holder, showing it as provided with a head which is interchangeable with the boring bar holder.

Fig. 5 is a top plan view thereof, different adjustments of the tool holding head being indicated by dotted lines.

Fig. 6 is a side elevation of one end of the shank.

Fig. 7 is a top plan view of the tool holder.

Fig. 8 is a top plan view of the boring bar holder.

Corresponding and like parts are referred to in the following description and indicated in all the views of the drawings by the same reference characters.

For the purpose of illustration the invention is shown in Fig. 1 as mounted in operative position upon a conventional form of lathe, the numeral 1 designating the bed of the lathe, 2 the head stock which is provided with the usual chuck 3, and 4 the tail stock. The main feed block 5 is mounted for longitudinal movement upon the bed 1 and carries the upper feed block 6 which is adjustable transversely upon the main feed block 5, and has the usual tool post 7 projecting upwardly therefrom.

The tool holding device includes an elongated flat shank 8 which terminates at one end in an enlarged cylindrical head 9 which is bifurcated at 10 for pivotal connection with either a boring bar holder 11 or a tool holder 12, the said members 11 and 12 being interchangeable with each other. The flat shank 8 is adapted to be clamped in the usual manner within the slotted portion of the tool post 7 of the lathe by means of a clamping nut $7^a$.

The boring bar holder 11 is provided at its forward end with a socket 13 within which a boring bar 14 is inserted, said bar being provided at its outer end with a cutter or bead 15 which is clamped in position by a set screw 16, and may either be disposed at right angles to the boring bar or at an angle of 45° thereto. The end of the boring bar which is inserted in the socket 13 of the boring bar holder is formed with a flat side $14^a$ which is engaged by a set screw 17, thereby enabling the boring bar to be rigidly clamped in proper position. The rear end of the boring bar holder 11 is recessed to fit around the cylindrical head 9 of the shank 8, and formed with a pivot tongue 18 which is circular in shape and is received within the bifurcation 10 of the head. A pivot pin 19 extends axially through the cylinder head 9 and pivot tongue 18, thereby detachably securing the boring bar holder to the head. The body portion of this pivot pin has a tapered formation and the lower end thereof is reduced and threaded at $19^a$. A polygonal head 20 is provided at the upper end of the pivot pin, and owing to the tapered formation of the pin it will be obvious that any looseness in the connection can be quickly removed by merely tightening the same. For the purpose of locking the boring bar holder 11 in axial alinement with the shank 8, the edge of the pivot tongue 18 is notched at 21 for engagement with the reduced nose 22ª of a locking screw 22 which is threaded in the top of the shank. The end of the pivot tongue 18 of the boring bar holder, and the base of the bifurcation 10 in the head 9 of the shank 8 are correspondingly recessed at 30 to receive a short positioning pin 31 which provides an additional means for maintaining the boring bar holder rigidly in alinement with the shank 8. A rigid connection is thus obtained, and it will be understood that the boring bar holder is only held in this one position.

The tool holder 12, shown by Figs. 4, 5 and 7, is interchangeable with the boring bar holder 11, being formed with a pivot tongue 24 which is adapted to be fitted in the bifurcation 10 of the head 9 of the shank, and to be engaged by the pivot pin 19. This tool holder 12 is formed with a bore which is inclined upwardly with respect to the axis of the shank, and which is adapted to receive a bit 25, said bit being held in position by a set screw 26. The edge of the pivot tongue 24 of the tool holder 12 is provided with a series of notches 27, any selected one of which is adapted to be engaged by the nose 22ª of the locking screw 22, thereby enabling the tool holder to be locked in any one of the angular positions indicated by Fig. 5. With the construction shown the tool holder can be locked in alinement with the shank, or at an angle of 45° or 90° on either the right or the left hand side of the shank. The tool can thus be used for a large variety of work, and the cutting bit will be held rigidly in position, since the tapered construction of the pivot pin 19 is such that a large bearing is obtained and any looseness can be taken up by tightening the pin.

Having thus described the invention, what I claim as new and desire to secure by Letters Patent, is:—

A tool holder for lathes, including a flat shank adapted to be fitted in the tool post and having a cylindrical head at one end thereof, said head being transversely bifurcated and provided with an axial opening of which one end is tapered while the other end is reduced and threaded, a holder having a socket at its forward end and a cylindrical tongue at its rear end which fits within the bifurcation of the cylindrical head of the shank and is formed with a corresponding tapered opening, a tapered pivot pin fitted in the tapered openings of the cylindrical head and tongue and having a threaded stem at one end thereof which engages the reduced threaded end of the opening in the cylindrical head, and locking means for holding the holder in different angular positions with respect to the shank.

In testimony whereof I have signed my name to this specification in the presence of two subscribing witnesses.

WILLIAM G. J. THOMPSON.

Witnesses:
JOSEPH MCCULLOUGH,
SAMUEL J. THOMPSON.

Copies of this patent may be obtained for five cents each, by addressing the "Commissioner of Patents, Washington, D. C."